United States Patent
Gwidt et al.

(10) Patent No.: US 9,376,975 B2
(45) Date of Patent: Jun. 28, 2016

(54) STOCHASTIC PRE-IGNITION PREDICTION AND MITIGATION SYSTEMS AND METHODS

(71) Applicant: GM GLOBAL TECHNOLOGY OPERATIONS LLC, Detroit, MI (US)

(72) Inventors: J. Michael Gwidt, Brighton, MI (US); Bjorn E. Soderstrom, West Bloomfield, MI (US); Kevin M. Luchansky, Sterling Heights, MI (US); Craig M. Sawdon, Williamston, MI (US); Wajdi B. Hamama, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 858 days.

(21) Appl. No.: 13/712,178

(22) Filed: Dec. 12, 2012

(65) Prior Publication Data

US 2014/0163844 A1    Jun. 12, 2014

(51) Int. Cl.
*F02D 41/10* (2006.01)
*F02D 41/14* (2006.01)
*F02D 41/04* (2006.01)
*F02D 41/00* (2006.01)

(52) U.S. Cl.
CPC ............ *F02D 41/14* (2013.01); *F02D 41/0007* (2013.01); *F02D 41/047* (2013.01); *F02D 41/10* (2013.01); *F02D 2200/0406* (2013.01); *Y02T 10/144* (2013.01)

(58) Field of Classification Search
CPC ..... Y02T 10/144; F02D 41/14; F02D 41/047; F02D 41/0007; F02D 41/10; F02D 2200/0406
USPC ...................... 701/111; 123/406.19
See application file for complete search history.

(56) References Cited

U.S. PATENT DOCUMENTS

| | | | |
|---|---|---|---|
| 2012/0035835 A1* | 2/2012 | Glugla | F02D 35/027 701/111 |
| 2013/0047956 A1* | 2/2013 | Davis | F02P 5/152 123/406.11 |

* cited by examiner

*Primary Examiner* — Hieu T Vo
*Assistant Examiner* — Arnold Castro

(57) ABSTRACT

An engine control system for a vehicle includes a timer module, a stochastic pre-ignition (SPI) mitigation module, and a boost control module. The timer module tracks a period of operation of an engine where vacuum within an intake manifold is less than a first predetermined vacuum. The SPI mitigation module generates an SPI signal when the period is greater than a predetermined period and the vacuum is less than a second predetermined vacuum. The second predetermined vacuum is less than the first predetermined vacuum. The boost control module reduces output of a turbocharger in response to the generation of the SPI signal.

20 Claims, 3 Drawing Sheets

STOCHASTIC PRE-IGNITION PREDICTION AND MITIGATION SYSTEMS AND METHODS

FIELD

The present disclosure is related to internal combustion engines and more particularly to stochastic pre-ignition (SPI) in internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engine control systems monitor a position of a crankshaft of an engine. Rotational speed of the crankshaft (engine speed) and crankshaft acceleration can be determined based on the crankshaft position. For example only, fueling, ignition timing, throttle opening, and/or other engine parameters may be controlled based on the crankshaft position, the engine speed, and/or the acceleration.

A crankshaft position monitoring system typically includes a control module (e.g., an engine control module), a crankshaft position sensor, and a toothed wheel that rotates with the crankshaft. The toothed wheel may have N number of teeth, and the crankshaft position sensor may monitor passing of the teeth. The crankshaft position sensor generates pulses in a crankshaft position signal as the teeth of the toothed wheel pass the crankshaft sensor.

The control module determines the crankshaft position based on the pulses in the crankshaft position signal. The control module may determine the crankshaft position at various crankshaft rotation intervals. As an example, the control module may determine the crankshaft position at intervals of greater than or equal to 90° of crankshaft rotation. The resolution of the crankshaft position signal (e.g., number of samples per crankshaft revolution) may increase as the intervals decrease.

SUMMARY

An engine control system for a vehicle includes a timer module, a stochastic pre-ignition (SPI) mitigation module, and a boost control module. The timer module tracks a period of operation of an engine where vacuum within an intake manifold is less than a first predetermined vacuum. The SPI mitigation module generates an SPI signal when the period is greater than a predetermined period and the vacuum is less than a second predetermined vacuum. The second predetermined vacuum is less than the first predetermined vacuum. The boost control module reduces output of a turbocharger in response to the generation of the SPI signal.

In other features, an engine control system for a vehicle includes a timer module, a stochastic pre-ignition (SPI) mitigation module, and a boost control module. The timer module tracks a period of operation of an engine where a pressure within an intake manifold is less than a first predetermined pressure. The SPI mitigation module generates an SPI signal when the period is greater than a predetermined period and the pressure transitions from less than the first predetermined pressure to greater than a second predetermined pressure. The second predetermined pressure is greater than the first predetermined pressure. The boost control module reduces output of a turbocharger in response to the generation of the SPI signal.

In other features, an engine control method for a vehicle, includes: tracking a period of operation of an engine where vacuum within an intake manifold is less than a first predetermined vacuum; and generating a stochastic pre-ignition (SPI) signal when the period is greater than a predetermined period and the vacuum is less than a second predetermined vacuum. The second predetermined vacuum is less than the first predetermined vacuum. The engine control method further includes: reducing output of a turbocharger in response to the generation of the SPI signal.

In other features, an engine control method for a vehicle, includes: tracking a period of operation of an engine where a pressure within an intake manifold is less than a first predetermined pressure; and generating a stochastic pre-ignition (SPI) signal when the period is greater than a predetermined period and the pressure transitions from less than the first predetermined pressure to greater than a second predetermined pressure. The second predetermined pressure is greater than the first predetermined pressure. The engine control method further includes: reducing output of a turbocharger in response to the generation of the SPI signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Under some circumstances, a stochastic pre-ignition (SPI) event may occur within an engine. For example, combustible matter may accumulate within the engine during a period of operation of the engine where engine vacuum is less than a predetermined value. Combustible matter may accumulate, for example, in crevasses of the cylinders of the engine, such as near piston ring lands, near piston rings, near the spark plugs, and in other locations within the cylinders.

SPI may occur when a driver requests an increase in engine torque output following a period of operation where the engine vacuum is less than the predetermined vacuum. The associated increase in airflow into the engine that occurs when the driver requests the increase in engine torque output may enable some or all of the accumulated combustible matter to combust and cause SPI. SPI may cause engine damage if not detected and/or not remediated. An engine control module takes one or more remedial actions when SPI may occur to prevent and/or mitigate SPI, such as reducing output of a boost device, advancing spark timing, and/or adjusting fueling.

Figure 1:
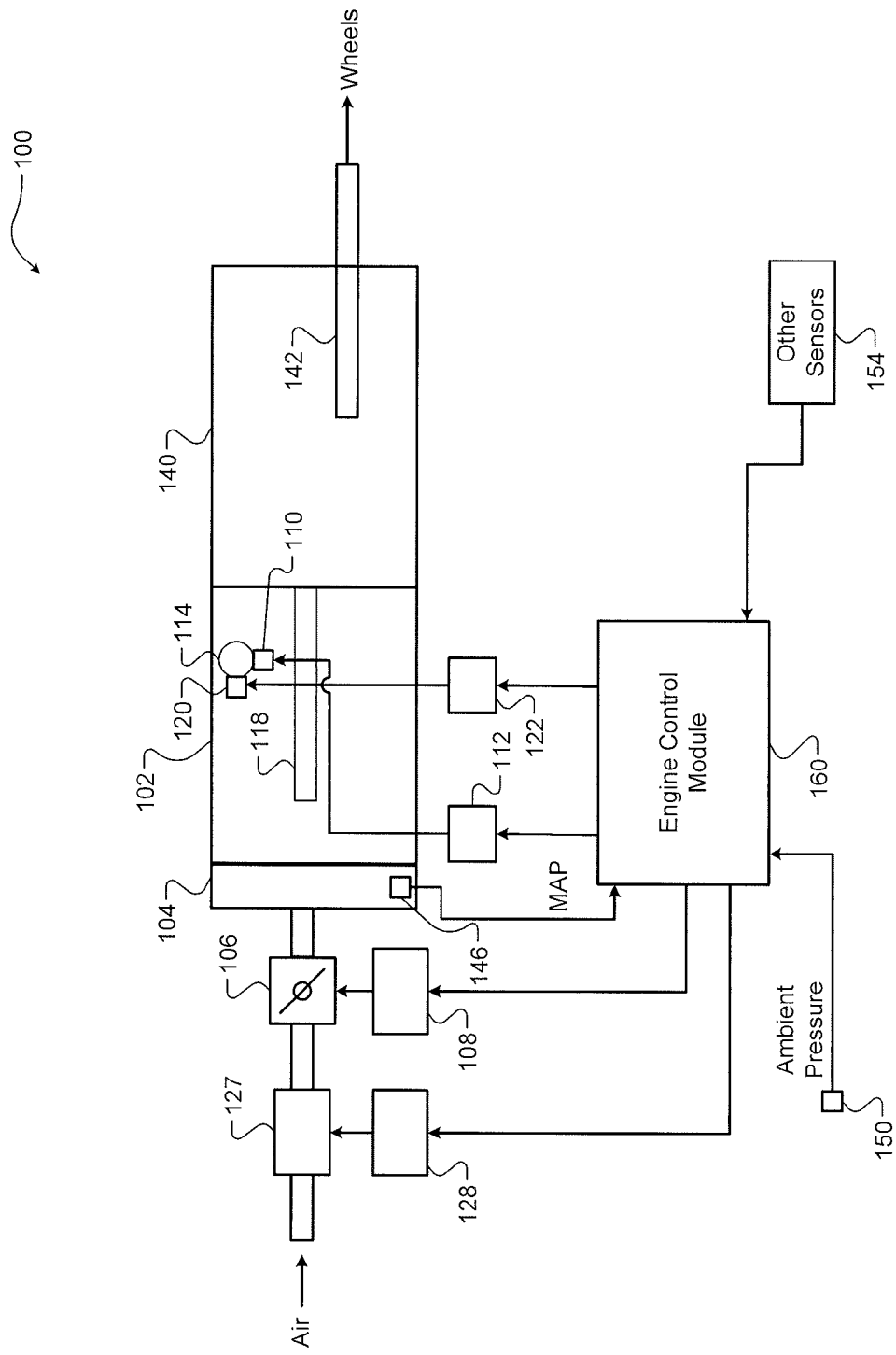
FIG. 1 is a functional block diagram of an example vehicle system according to the present disclosure.

Referring now to FIG. 1, a functional block diagram of an example vehicle system 100 is presented. An engine 102 generates torque for a vehicle. Air is drawn into the engine 102 through an intake manifold 104. Airflow into the engine 102 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s). The fuel injectors may inject fuel directly into the cylinders or, for example, into fuel injection ports of the cylinders, respectively.

A cylinder 114 includes a piston (not shown) that is coupled to a crankshaft 118. Although the engine 102 is depicted as including only the cylinder 114, the engine 102 may include more than one cylinder. One combustion cycle of the cylinder 114 may include four strokes: an intake stroke, a compression stroke, an expansion stroke, and an exhaust stroke. One engine cycle includes each of the cylinders undergoing one combustion cycle.

During the intake stroke, the piston approaches a bottom most position, and the air and fuel may be provided to the cylinder 114. The bottom most position may be referred to as a bottom dead center (BDC) position. During the compression stroke, the crankshaft 118 drives the piston toward a top most position and compresses the air/fuel mixture within the cylinder 114. The top most position may be referred to as a top dead center (TDC) position. A spark plug 120 may ignite the air/fuel mixture within the engine 102. A spark actuator module 122 controls the spark plug(s).

Combustion of the air/fuel mixture drives the piston away from the TDC position during the expansion stroke and rotatably drives the crankshaft 118. The rotational force (i.e., torque) may be a source of compressive force for a compression stroke of a combustion cycle of one or more cylinders that follow the cylinder in a predetermined firing order. Exhaust gas resulting from the combustion of the air/fuel mixture is expelled from the cylinder 114 during the exhaust stroke.

One or more boost devices, such as a turbocharger 127 or a supercharger, may be implemented. While only one boost device is shown, multiple boost devices may be implemented. The turbocharger 127 may pressurize air within the intake manifold 104. A boost actuator module 128 controls the output of the turbocharger 127. Boost may be described as an amount that the pressure within the intake manifold 104 is greater than ambient pressure.

The engine 102 outputs torque to a transmission 140. The transmission 140 may include a manual type transmission, an automatic type transmission, an auto-manual type transmission, or another suitable type of transmission. The transmission 140 may output torque to one or more wheels (not shown) via a transmission output shaft 142 and a driveline (not shown).

A manifold absolute pressure (MAP) sensor 146 may measure pressure within the intake manifold 104 and generate a MAP based on the pressure within the intake manifold 104. An ambient pressure sensor 150 may measure ambient (barometric) air pressure and generate an ambient air pressure based on the measured pressure. One or more other sensors 154 may also be implemented, such as a mass air flowrate (MAF) sensor, an intake air temperature (IAT) sensor, an oil temperature sensor, an engine coolant temperature sensor, etc.

Engine actuator modules control engine actuators based on signals from an engine control module (ECM) 160, respectively. For example, the throttle actuator module 108 control the throttle valve 106 based on signals from the ECM 160, the fuel actuator module 112 controls the fuel injector(s) based on signals from the ECM 160, the spark actuator module 122 controls the spark plug(s) based on signals from the ECM 160, and the boost actuator module 128 controls the boost device(s) based on signals from the ECM 160. Other engine actuators, such as valve actuators, for example, may be included and controlled based on signals from the ECM 160.

Under some circumstances, stochastic pre-ignition (SPI) may occur. For example, SPI may occur when a driver requests an increase in engine torque output following a period of operation with vacuum within the intake manifold 104 less than a predetermined value. A driver may requests an increase in engine torque output following a period of operation with vacuum within the intake manifold 104 less than the predetermined value, for example, when a passing maneuver is executed, during travel on a hill, and/or under other circumstances.

During the period of operation where the vacuum within the intake manifold 104 is less than the predetermined value, combustible matter may accumulate within the engine 102. For example, combustible matter may accumulate in crevasses of the cylinders of the engine 102, such as near piston ring lands, near piston rings, near the spark plugs, etc. The associated increase in airflow into the engine 102 that occurs when the driver requests the increase in engine torque output may enable some or all of the accumulated combustible matter to combust and cause SPI. SPI may cause engine damage if not detected and/or not remediated. SPI is different than misfire and knock. The ECM 160 takes one or more remedial actions when SPI may occur to prevent and/or mitigate SPI.

Figure 2:
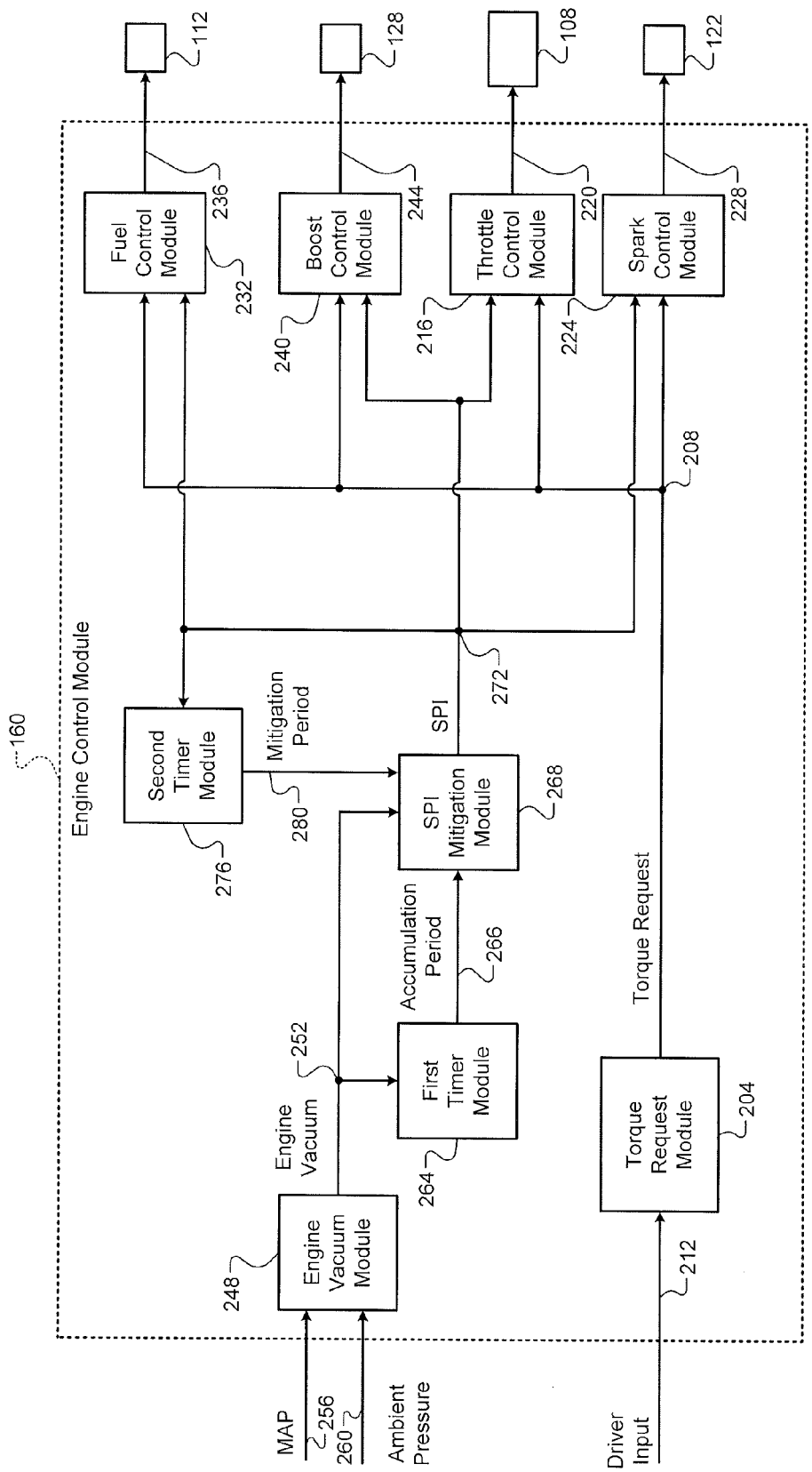
FIG. 2 is a functional block diagram of an example engine control system according to the present disclosure.

Referring now to FIG. 2, a functional block diagram of an example implementation of the ECM 160 is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 160 and/or torque requests received from other modules of the vehicle, such as a transmission control module, a hybrid control module, a chassis control module, etc.

One or more engine operating parameters may be controlled based on the torque request 204 and/or one or more other torque requests. For example, a throttle control module 216 may determine a desired throttle opening 220 based on the torque request 208. The throttle actuator module 108 may adjust opening of the throttle valve 106 based on the desired throttle opening 220. A spark control module 224 may determine a desired spark timing 228 based on the torque request 208. The spark actuator module 122 may generate spark based on the desired spark timing 228. A fuel control module 232 may determine one or more desired fueling parameters 236 based on the torque request 208. For example, the desired fueling parameters 236 may include fuel injection amount, number of fuel injections for injecting the amount, and timing for each of the injections. The fuel actuator module 112 may inject fuel based on the desired fueling parameters 236. A boost control module 240 may determine a desired boost 244 based on the torque request 208. The boost actuator module 128 may control boost output by the boost device(s) based on the desired boost 244.

An engine vacuum module 248 determines an engine vacuum 252 based on a difference between a MAP 256 measured using the MAP sensor 146 and an ambient (air) pressure 260. The ambient pressure 260 may, for example, be measured using the ambient pressure sensor 150, obtained from one or more other sources (e.g., via a wireless network connection), or set to a predetermined pressure.

A first timer module 264 selectively increments and resets an accumulation period 266. The first timer module 264 may increment and reset the accumulation period 266 based on the engine vacuum 252. For example, the first timer module 264 may increment the accumulation period 266 when the engine vacuum 252 is less than a first predetermined value and reset the accumulation period 266 when the engine vacuum 252 is greater than the first predetermined value. The first predetermined value may be calibratable and may be set, for example, to approximately 20-30 kilo-Pascal (kPa) for an ambient pressure of 100 kPa. In various implementations, the first predetermined value may be determined as a function of ambient pressure, for example, using an equation or a lookup table. The accumulation period 266 corresponds to the period that the engine 102 has been operated with conditions that may cause SPI if airflow into the engine 102 increases.

In various implementations, the first timer module 264 may increment and reset the accumulation period 266 based on the MAP 256. For example, the first timer module 264 may increment the accumulation period 266 when the MAP 256 is less than a second predetermined value and reset the accumulation period 266 when the engine vacuum 252 is greater than the second predetermined value. The second predetermined value may be calibratable and may be set, for example, to approximately 70-80 kPa for an ambient pressure of 100 kPa.

An SPI mitigation module 268 generates an SPI signal 272 that indicates whether SPI is likely to occur. For example, the SPI mitigation module 268 may set the SPI signal 272 to a first state when SPI will likely occur and set the SPI signal 272 to a second state when SPI will not likely occur.

The SPI mitigation module 268 may indicate whether SPI is likely to occur based on the accumulation period 266 and/or the engine vacuum 252. For example, the SPI mitigation module 268 may indicate that SPI will likely occur when the accumulation period 266 is greater than a first predetermined period and the engine vacuum 252 is greater than a third predetermined value. The SPI mitigation module 268 may indicate that SPI will not likely occur when the accumulation period 266 is less than the first predetermined period and/or the engine vacuum 252 is less than the third predetermined value. The third predetermined value and the first predetermined period may be calibratable and may be set, for example, to approximately 0 kPa (ambient pressure) and approximately 10 minutes, respectively. The third predetermined value is less than the first predetermined value.

When the accumulation period 266 is incremented and reset based on the MAP 256, the MAP may be used by the SPI mitigation module 268. For example, the SPI mitigation module 268 may indicate that SPI will likely occur when the accumulation period 266 is greater than a predetermined period and the MAP 256 is greater than a fourth predetermined value. The SPI mitigation module 268 may indicate that SPI will not likely occur when the accumulation period 266 is less than the predetermined period and/or the MAP 256 is less than the fourth predetermined value. The fourth predetermined value may be calibratable and may be set, for example, to approximately 150 kPa. The fourth predetermined value is greater than the second predetermined value and may be set to ambient pressure or greater than ambient pressure.

In various implementations, the SPI mitigation module 268 may indicate whether SPI is likely to occur based on the accumulation period 266 and/or the torque request 208. For example, the SPI mitigation module 268 may indicate that SPI will likely occur when the accumulation period 266 is greater than the first predetermined period and the torque request 208 is greater than a predetermined torque. The SPI mitigation module 268 may indicate that SPI will not likely occur when the accumulation period 266 is less than the first predetermined period and/or the torque request 208 is less than the predetermined torque.

The first predetermined period corresponds to a minimum period of operation of the engine 102 where the engine vacuum 252 less than the first predetermined value (or the MAP 256 less than the second predetermined value) and matter trapped within the cylinders may combust and cause SPI when the engine vacuum 252 becomes less than the third predetermined value (or the MAP 256 becomes greater than the fourth predetermined value). The third and fourth predetermined values may correspond to minimum values of the engine vacuum 252 and the MAP 256 where matter trapped within the cylinders may combust and cause SPI.

One or more remedial actions may be taken in response to the SPI mitigation module 268 indicating that SPI will likely occur. For example, in response to the SPI mitigation module 268 indicating that SPI will likely occur, the fuel control module 232 may richen fueling and/or adjust fuel injection timing, the boost control module 240 may reduce the output of the turbocharger 127, and/or the spark control module 224 may advance the spark timing.

A second timer module 276 resets and increments an SPI mitigation period 280. When the SPI mitigation module 268 indicates that SPI will likely occur (e.g., via the SPI signal 272 being in the first state), the second timer module 276 increments the SPI mitigation period 280. The second timer module 276 may reset the SPI mitigation period 280 in response to the SPI signal 272 transitioning from the second state to the first state. In this manner, the SPI mitigation period 280 corresponds to the period that one or more remedial actions have been taken to prevent and/or mitigate SPI.

The SPI mitigation module 268 may monitor the SPI mitigation period 280 and transition the SPI signal 272 from the first state to the second state when the SPI mitigation period 280 is greater than a second predetermined period. The second predetermined period may be calibratable and may be set, for example, to approximately 0.5-2.0 seconds. The second predetermined period corresponds to a period of operation of the engine 102 after which all of the matter trapped within the cylinders will have been combusted. The one or more remedial actions may be disabled in response to the transitioning of the SPI signal 272 from the first state to the second state.

Figure 3:
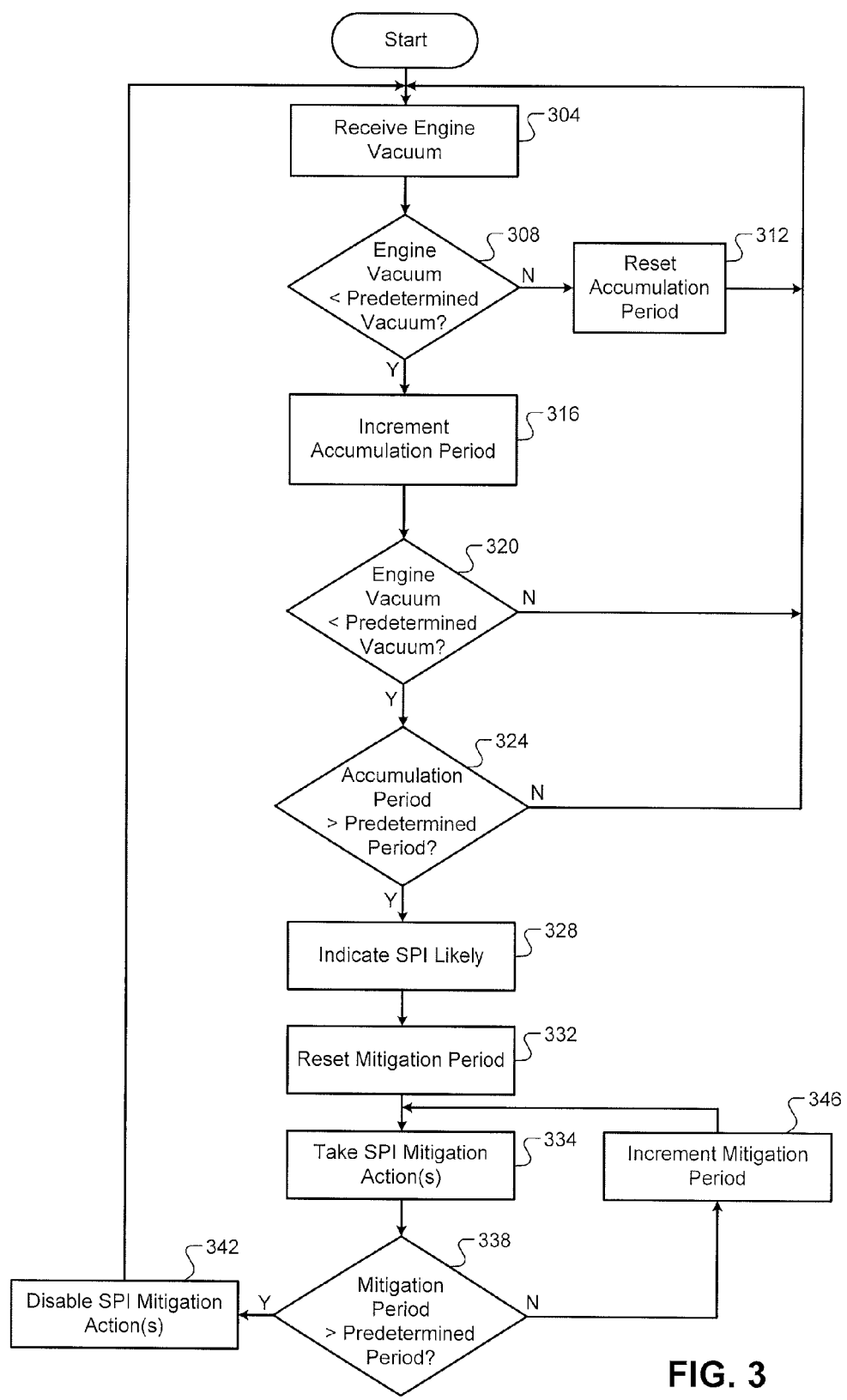
FIG. 3 is a flowchart depicting an example method of predicting and mitigating stochastic pre-ignition (SPI) according to the present disclosure.

Referring now to FIG. 3, a flowchart depicting an example method of predicting and mitigating SPI. Control begins with 304 where the engine vacuum module 248 determines the engine vacuum 252. The engine vacuum module 248 determines the engine vacuum 252 based on a difference between the MAP 256 and the ambient pressure 260.

At 308, the first timer module 264 determines whether the engine vacuum 252 is less than the first predetermined value. If false, the first timer module 264 resets the accumulation period 266 at 312, and control returns to 304. If true, the first timer module 264 increments the accumulation period 266 at 316, and control continues with 320. For example only, the first predetermined value may be approximately 20-30 kPa for an ambient pressure of 100 kPa or another suitable value.

The SPI mitigation module 268 may determine whether the engine vacuum 252 is less than the third predetermined vacuum at 320. If true, control continues with 324. If false, control returns to 304. For example only, the third predetermined value may be approximately 0 kPa for an ambient pressure of 100 kPa or another suitable value.

At 324, the SPI mitigation module 268 determines whether the accumulation period 266 is greater than the first predetermined period. If false, the SPI mitigation module 268 indicates that SPI is not likely to occur (e.g., set the SPI signal 272 to the second state), and control returns to 304. If true, the SPI mitigation module 268 indicates that SPI is likely to occur (e.g., set the SPI signal 272 to the first state) at 328, and control continues with 332. For example only, the first predetermined period may be approximately 10 minutes or another suitable period.

The second timer module 276 resets the SPI mitigation period 280 at 332, and control continues with 334. At 334, one or more remedial actions are taken. For example, the fuel control module 232 may richen fueling and/or adjust fuel injection timing, the boost control module 240 may reduce the output of the turbocharger 127, and/or the spark control module 224 may advance the spark timing at 334.

At 338, the SPI mitigation module 268 determines whether the SPI mitigation period 280 is greater than the second predetermined period. If true, the SPI mitigation module 268 transitions the SPI signal 272 from the first state to the second state, and the one or more remedial actions are disabled at 342. Control returns to 304. If false, the SPI mitigation module 268 maintains the SPI signal 272 in the first state, the second timer module 276 increments the SPI mitigation period at 346, and control returns to 334 to continue taking the one or more remedial actions until the SPI mitigation period 280 is greater than the second predetermined period. For example only, the second predetermined period may be approximately 0.5-2.0 seconds or another suitable period. While use of the engine vacuum 252 and the associated predetermined values has been discussed in conjunction with the example of FIG. 3, as stated above, the MAP 256 and the associated predetermined values may be used.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. An engine control system for a vehicle, comprising:
a timer module that tracks a period of operation of an engine where vacuum within an intake manifold is less than a first predetermined vacuum;
a stochastic pre-ignition (SPI) mitigation module that generates an SPI signal when the period is greater than a predetermined period and the vacuum is less than a second predetermined vacuum,
wherein the second predetermined vacuum is less than the first predetermined vacuum; and
a boost control module that reduces output of a turbocharger in response to the generation of the SPI signal.

2. The engine control system of claim 1 further comprising a second timer module that tracks a period of the reduction of the output of the turbocharger,
wherein the boost control module disables the reduction of the output of the turbocharger when the period of the reduction is greater than a second predetermined period.

3. The engine control system of claim 1 wherein the second predetermined vacuum corresponds to ambient air pressure.

4. The engine control system of claim 1 further comprising a fuel control module that selectively richens fueling in response to the generation of the SPI signal.

5. The engine control system of claim 1 further comprising a fuel control module that selectively adjusts fuel injection timing in response to the generation of the SPI signal.

6. The engine control system of claim 1 further comprising a spark control module that selectively adjusts spark timing in response to the generation of the SRI signal.

7. The engine control system of claim 1 further comprising:
a fuel control module that selectively adjusts fueling in response to the generation of the SRI signal; and
a spark control module that selectively advances spark timing in response to the generation of the SPI signal.

8. The engine control system of claim 7 further comprising a second timer that tracks a period of the reduction in the output of the turbocharger,
wherein, when the period of the reduction is greater than a second predetermined period:
the boost control module disables the reduction in the output of the turbocharger;
the fuel control module disables the adjustment of the fueling; and
the spark control module disables the advancement of the spark timing.

9. The engine control system of claim 1 wherein the predetermined period is greater than 5 minutes.

10. An engine control system for a vehicle, comprising:
a timer module that tracks a period of operation of an engine where a pressure within an intake manifold is less than a first predetermined pressure;
a stochastic pre-ignition (SPI) mitigation module that generates an SPI signal when the period is greater than a predetermined period and the pressure transitions from less than the first predetermined pressure to greater than a second predetermined pressure, wherein the second predetermined pressure is greater than the first predetermined pressure; and a boost control module that reduces output of a turbocharger in response to the generation of the SPI signal.

11. An engine control method for a vehicle, comprising:

tracking a period of operation of an engine where vacuum within an intake manifold is less than a first predetermined vacuum;

generating a stochastic pre-ignition (SPI) signal when the period is greater than a predetermined period and the vacuum is less than a second predetermined vacuum, wherein the second predetermined vacuum is less than the first predetermined vacuum; and reducing output of a turbocharger in response to the generation of the SPI signal.

12. The engine control method of claim 11 further comprising:

tracking a period of the reduction of the output of the turbocharger; and disabling the reduction of the output of the turbocharger when the period of the reduction is greater than a second predetermined period.

13. The engine control method of claim 11 wherein the second predetermined vacuum corresponds to ambient air pressure.

14. The engine control method of claim 11 further selectively richening fueling in response to the generation of the SPI signal.

15. The engine control method of claim 11 further comprising selectively adjusting fuel injection timing in response to the generation of the SPI signal.

16. The engine control method of claim 11 further comprising selectively adjusting spark timing in response to the generation of the SPI signal.

17. The engine control method of claim 11 further comprising:

selectively adjusting fueling in response to the generation of the SPI signal; and selectively advancing spark timing in response to the generation of the SPI signal.

18. The engine control method of claim 17 further comprising:

tracking a period of the reduction in the output of the turbocharger; and when the period of the reduction is greater than a second predetermined period:

disabling the reduction in the output of the turbocharger;

disabling the adjustment of the fueling; and disabling the advancement of the spark timing.

19. The engine control method of claim 11 wherein the predetermined period is greater than 5 minutes.

20. An engine control method for a vehicle, comprising:

tracking a period of operation of an engine where a pressure within an intake manifold is less than a first predetermined pressure;

generating a stochastic pre-ignition (SPI) signal when the period is greater than a predetermined period and the pressure transitions from less than the first predetermined pressure to greater than a second predetermined pressure, wherein the second predetermined pressure is greater than the first predetermined pressure; and reducing output of a turbocharger in response to the generation of the SPI signal.

* * * * *